UNITED STATES PATENT OFFICE.

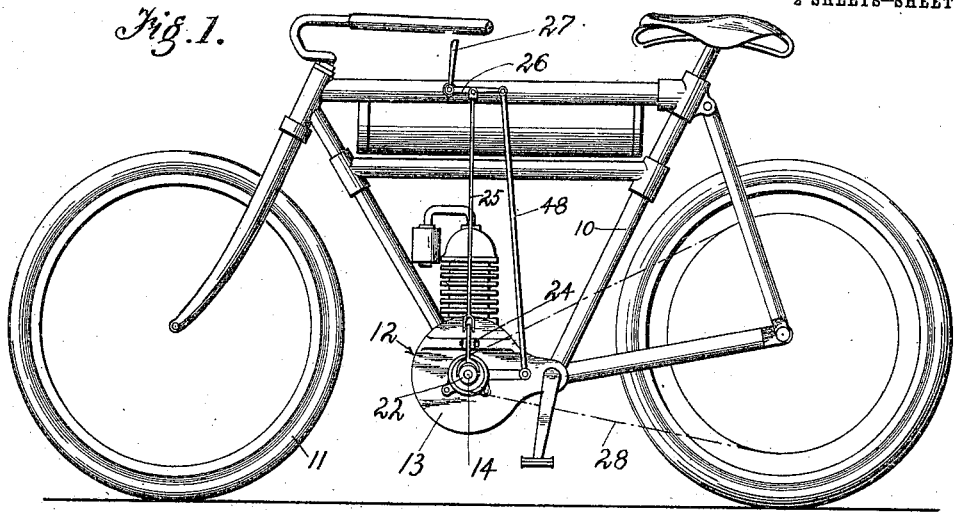

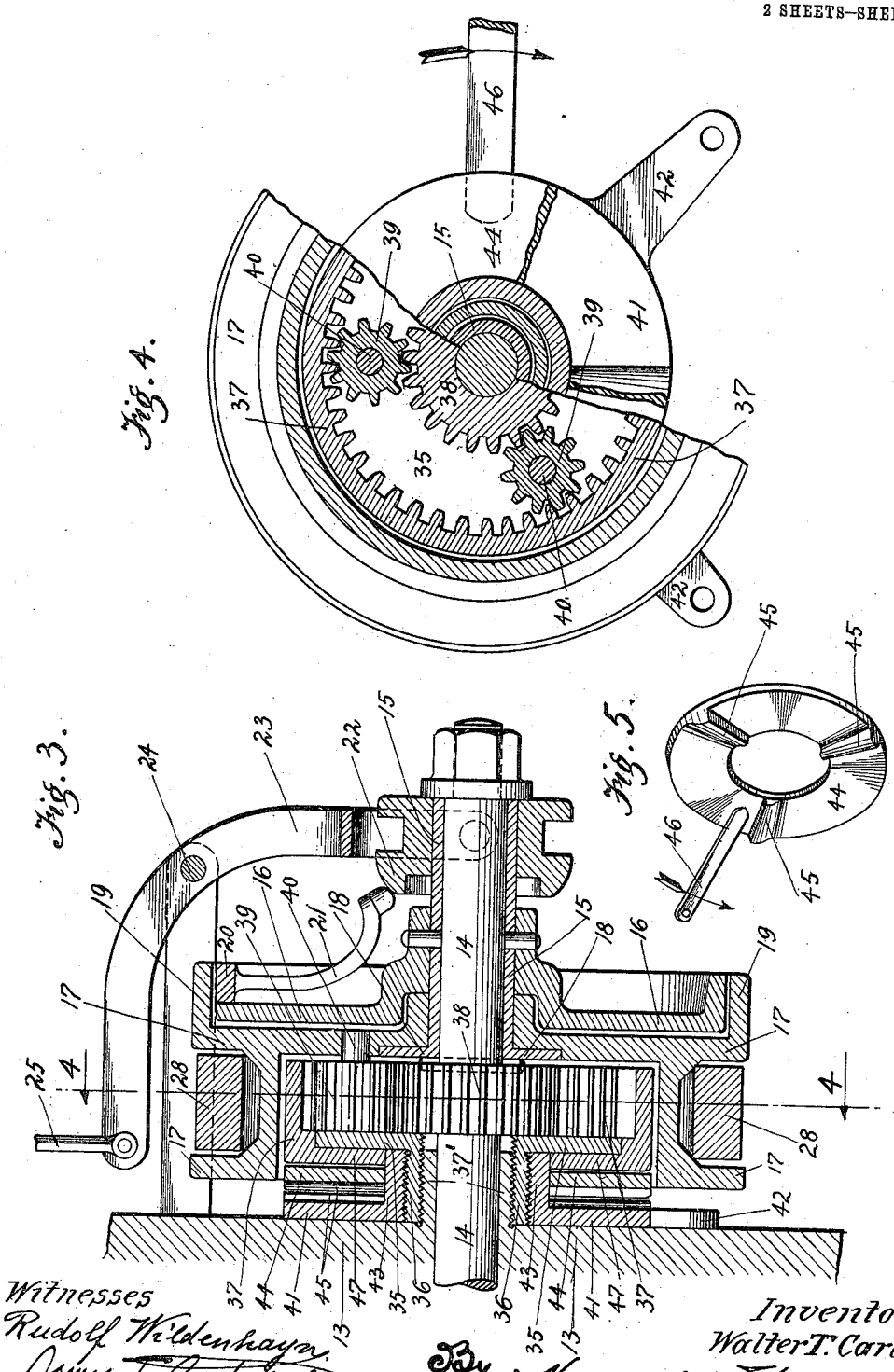

WALTER T. CARTER, OF LOS ANGELES, CALIFORNIA.

CHANGE-SPEED GEARING.

985,511.  Specification of Letters Patent.  Patented Feb. 28, 1911.

Application filed June 8, 1908. Serial No. 437,343.

*To all whom it may concern:*

Be it known that I, WALTER T. CARTER, a citizen of the United States, residing at Los Angeles, in the county of Los Angeles and State of California, have invented new and useful Improvements in Change-Speed Gearing for Motor-Cycles, of which the following is a specification.

The prime object of this invention is to provide a change gear for motor cycles whereby the relative speed of rotation of the engine shaft and the traction wheel may be changed quickly whenever it is desired to do so.

The invention consists of an attachment readily applicable to the usual motor cycle in place of the pulley ordinarily secured upon the engine shaft. In the attachment for accomplishing my invention a belt pulley is loosely placed upon the shaft and may be connected by either of two means thereto. One of these means constitutes a simple friction clutch which forces the pulley to rotate synchronously with the engine shaft when the clutch is expanded. The other means involves a system of planetary gears which will lock into operative position to rotate the belt pulley at a slower rate of speed than the shaft. Means are provided to throw either of the clutching means out of engagement as the other is thrown in, this operating means being easily actuated by the rider.

In the accompanying drawings, forming a part of this specification:—Figure 1,— is a side elevation of a motor cycle equipped with my improved gear. Fig. 2,— is an enlarged side elevation of the gear. Fig. 3,— is a longitudinal vertical section of the same. Fig. 4,— is a section taken partly on line 4—4 of Fig. 3, with parts broken away to show elements beyond the section line. Fig. 5,— is a perspective detail of one of the clutch disks for the low gear.

In the drawings 10 designates the frame of a motor cycle supported by wheels 11 and provided with driving engine 12 in the usual manner. I have shown a motor cycle of the belt drive type but it will be obvious from the following description that my invention may be applied to a chain drive as well as to the one described. The improved gear is mounted upon crank case 13 of the engine and around engine shaft 14. Rigidly mounted upon the outer end of shaft 14 is a sleeve 15 carrying clutch member 16 rigidly mounted thereon and driving pulley 17 loosely mounted thereon against a flange 18 on its inner end. Driving pulley 17 is provided with an overhanging flange 19 inside of which member 16 of the clutch is adapted to revolve. Member 16 of the clutch is provided with a plurality of expanding segments 20 of usual design having inwardly extending arms 21 which contact with a cone 22 loosely mounted upon sleeve 15. Cone 22 is operated by a bifurcated lever 23 pivoted at 24 to supports secured to the crank case of the engine or any other convenient part. Lever 23 is of the bell crank type and to its inner and upper end is secured a rod 25 which extends upwardly on the motor cycle to be connected to the operating lever 26 having a handle 27 in a convenient position to be operated by the rider. Upon the movement of this handle away from the seat of the motor cycle rod 25 is moved upwardly and cone 22 of the clutch is moved inwardly so that members 20 are expanded against the inner periphery of flange 19 and pulley 17 is rotatively locked to shaft 14 to drive rear wheel 11 through belt 28. When it is desired to throw pulley 17 out of direct engagement with shaft 14 handle 27 is pulled toward the rider and clutch members 20 are thereby allowed to contract.

Pulley 17 is made in an overhanging configuration and the mechanism of the low gear is mounted almost wholly within the pulley. This mechanism comprises a flange 35 having an internally threaded hub 36 which screws tightly onto externally threaded circular boss 37' on crank case 13 around shaft 14 so that it is rigidly stationary at all times. Running freely upon flange 35 is a large internally toothed gear 37 forming the outer member of a planetary gear system, the inner gear 38 being rigidly mounted upon shaft 14. The small intermediate gears 39 are mounted on studs 40 secured to pulley 17.

In the normal position of the parts of the low gear mechanism gear 37 is free to revolve so that pulley 17 is not rotated or hindered in its rotation by the fact that gears 39 are mounted on it. When it is desired to throw low gear into operation gear 37 is locked in a stationary position and studs 40 are thereupon moved to rotate pulley 17 at a smaller rate of speed than that at which gear 38 is traveling, the relative proportions of the speeds depending upon the relative sizes of gears 37 and 38.

To lock gear 37 in a non-movable position a stationary clutch plate 41 is screwed upon hub 36 of flange 35 and is also secured to the crank case by means of projecting lugs 42. This clutch disk is provided with a hub 43 on which a simple but rotating clutch disk 44 is mounted. Both disks are provided with wedge-shaped inclines 45 on their engaging surfaces so arranged that when lever 46 attached to disk 44 is moved downwardly the two disks are forced apart. As disk 41 is stationary disk 44 is forced against the radial flange 47 of gear 37 and holds the flange tightly between disk 44 and flange 35. This prevents gear 37 from rotating and pulley 17 is consequently rotated with shaft 14 but at a lower speed. Lever 46 is connected by rod 48 to lever 26 and it will be noted that upon the movement of handle 27 toward the rider the above operations of throwing the low gear into action will take place. Thus when the low gear is placed in action the high gear is necessarily thrown out of action and vice versa. Also when handle 27 is in the position illustrated in Fig. 1, both clutches are thrown out of gear so that the operator can stand the cycle against a curb without stopping the engine.

Having described my invention what I claim as new and desire to secure by Letters Patent is:—

1. Change speed gearing, comprising a driving shaft, a driven pulley loosely mounted thereon, a friction clutch adapted to rotatively lock said pulley to said shaft, a planetary gear system comprising a central gear rigidly mounted on said shaft, an outer gear, planetary gears mounted upon said pulley, rotative wedge means to lock said outer gear from rotation, and means to operate said rotative wedge means and to operate said friction clutch.

2. Change speed gearing comprising a driving shaft, a driving gear fixedly mounted on said driving shaft, a driven pulley rotatively mounted on said driving shaft, intermediate gears carried by said pulley and mounted to rotate thereon, an annular gear in mesh with said intermediate gears, a stationary clutch plate parallel to the plane of said annular gear and clutching means between said annular gear and said stationary clutch plate.

3. Change-speed gearing comprising a driving shaft, a driving gear rigidly attached to said shaft, a pulley loosely mounted on said shaft, a friction clutch between said pulley and said shaft for connecting said shaft to said pulley for a direct drive, an internal gear wheel mounted within said pulley, pinions carried by said pulley meshing with said internal gear and said first named gear, a rotatable collar disposed around said shaft adjacent to said internal gear, a fixed collar and means for shifting said rotatable collar toward said fixed collar so as to clamp said internal gear.

In witness that I claim the foregoing I have hereunto subscribed my name this 29th day of May, 1908.

WALTER T. CARTER.

Witnesses:
EDMUND A. STRAUSE,
OLLIE PALMER.

---

Copies of this patent may be obtained for five cents each, by addressing the "Commissioner of Patents, Washington, D. C."